United States Patent [19]

Okamoto et al.

[11] Patent Number: 5,570,979
[45] Date of Patent: Nov. 5, 1996

[54] TELESCOPIC COVER FOR A MACHINE TOOL

[75] Inventors: Shinya Okamoto; Akihiko Fujimoto, both of Yamanashi, Japan

[73] Assignee: Fanuc Ltd., Yamanashi, Japan

[21] Appl. No.: 516,333

[22] Filed: Aug. 17, 1995

[30] Foreign Application Priority Data

Aug. 18, 1994 [JP] Japan .................................. 6-194187

[51] Int. Cl.⁶ ............................ B23Q 11/08; B23C 9/00
[52] U.S. Cl. ........................... 409/134; 74/608; 160/202; 160/222
[58] Field of Search ........................ 409/134; 74/608; 144/251.2; 408/241.6, 710; 451/451, 454, 455; 160/202, 222, 223; 29/DIG. 56, DIG. 101

[56] References Cited

U.S. PATENT DOCUMENTS

| | | | |
|---|---|---|---|
| 3,565,153 | 2/1971 | Loos et al. | 160/202 |
| 3,570,578 | 3/1971 | Loos | 160/222 X |
| 3,578,061 | 5/1971 | Hascheck | 160/202 |
| 3,658,113 | 4/1972 | Loos | 160/202 |
| 4,039,021 | 8/1977 | Moritz | 160/202 |
| 4,522,246 | 6/1985 | Bierbraver et al. | 160/223 |
| 5,156,195 | 10/1992 | Wehler et al. | 74/608 X |
| 5,169,223 | 12/1992 | Suzuki et al. | 160/202 X |

FOREIGN PATENT DOCUMENTS

| | | | |
|---|---|---|---|
| 2642060 | 3/1978 | Germany | 409/134 |
| 3027443 | 2/1982 | Germany | 160/202 |
| 3217918 | 10/1983 | Germany | 160/202 |
| 1495062 | 7/1989 | U.S.S.R. | 409/134 |

*Primary Examiner*—William R. Briggs
*Attorney, Agent, or Firm*—Nikaido, Marmelstein, Murray & Oram LLP

[57] ABSTRACT

A telescopic cover, provided for a machine tool, which comprises a first member slidable between first and second positions along an axis and having first and second ends provided toward the first and second positions respectively, a second member provided beneath the first member stationary along the axis, and a feeding mechanism for moving the first member along the axis, the feeding mechanism being provided in a space beneath a horizontal plane substantially coincide with the top face of the second member. The telescopic cover comprises a pair of telescopic cover assemblies which are provided over the feeding mechanism so as to retract and extend along an axis when the first member moves along the axis. The pair of telescopic cover assemblies comprises a pair of first cover members attached to the first and second ends of the fist member to move with the first member, a pair of second cover members provided for the respective first cover members. The second cover members are slidable relative to the respective first cover members along the axis to retract into and come out of the respective first cover members. The second cover members are connected by a pair of connecting rods extending parallel to the axis.

7 Claims, 11 Drawing Sheets

TELESCOPIC COVER FOR A MACHINE TOOL

BACKGROUND OF THE INVENTION

1. Field of the Invention

The invention relates to a telescopic cover used for protecting a feeding mechanism of an X-Y table, in a machine tool, from the chips generated and the machining fluid used in a machining process.

2. Description of the Related Art

A cutting machine tool, for example, a vertical milling machine, cuts a workpiece mounted on an X-Y table into a desired shape by a rotating cutting tool with the workpiece fed along a tool travel path by the X-Y table. The X-Y table may comprise a saddle mounted on a column slidable along X- or Y-axis and a table mounted on the saddle slidable along the Y- or X-axis. The X-Y table further comprises a feeding mechanism, for feeding the table and saddle, which comprises, for example, ball screws and liner guides extending in X- and Y-directions.

A telescopic cover has been used for protecting the feeding mechanism from the chips generated and the machining fluid used in a machining process. The prior art telescopic cover is provided over the feeding mechanism. The telescopic cover comprises a plurality of cover members which are provided on either side of the saddle or table and are telescopically retractable along X- or Y-axis to be continuously presented over the feeding mechanism when the saddle or table moves along X- or Y-axis.

The end cover members in the prior art telescopic cover are fixedly provided with bearing and guiding the movable cover members, and do not function to protect the feeding mechanism from the chips and the machining fluid. Therefore, the prior art telescopic cover has room for improvement to remove the fixed cover members. Further, the chips are collected around the fixed guide members.

It is desirable to remove the end cover members provided only as a bearing and guiding means. However, the removal of the end cover members impairs the movement of the movable cover members.

SUMMARY OF THE INVENTION

The invention is directed to solve the problems of the prior art, and to provide an improved telescopic cover with no cover members which act as a bearing and guiding means, while the movement of the telescopic cover is not impaired.

According to the invention, there is provided a telescopic cover, on a machine tool, which comprises a first member slidable between first and second positions along an axis and having first and second ends provided toward the first and second positions respectively, a second member provided beneath the first member stationary along the axis and having first and second ends provided toward the first and second positions respectively, and a feeding mechanism for moving the first member along the axis, the feeding mechanism being provided in a space beneath a horizontal plane substantially coincident with the top face of the second member. The telescopic cover comprises a pair of telescopic cover assemblies attached to the first and second ends of the first member over the feeding mechanism such that the telescopic cover assemblies telescopically retract and extend along an axis when the first member moves along the axis, the pair of telescopic cover assemblies comprising a pair of first cover members extending over the horizontal plane and attached to the first and second ends of the first member to move with the first member, a pair of second cover members extending over the horizontal plane and provided for the respective first cover members, the second cover members being slidable relative to the respective first cover members along the axis to retract into and come out of respective first cover members, the first and second cover members having inner and outer ends along the axis respectively; a means for limiting the moving range of the second member along the axis to maintain the second cover member over the feeding mechanism when the first member moves along the axis; a means for bearing the second cover members slidable along the axis; and a means for connecting the second cover members to each other. The connecting means may comprise a pair of connecting rods extending parallel to the axis and connected to the respective inner ends of the second cover members.

According to another feature of the invention, the telescopic cover comprises a pair of telescopic cover assemblies attached to the first and second ends of the first member over the feeding mechanism such that the telescopic cover assemblies telescopically retract and extend along an axis when the first member moves along the axis, the pair of telescopic cover assemblies comprising a pair of first cover members extending over the horizontal plane and attached to the first and second ends of the first member to move with the first member, a pair of second cover members extending over the horizontal plane and provided for the respective first cover members, the second cover members being slidable relative to the respective first cover members along the axis to retract into and come out of the respective first cover members, the first and second cover members having inner and outer ends along the axis respectively; a means for limiting the moving range of the second member along the axis to maintain the second cover member over the feeding mechanism when the first member moves along the axis; a means for bearing the second cover members slidable along the axis; and the limiting means comprises first stopper members attached to the inner ends of the first cover members; second stopper members attached to the first cover members distant from the outer ends of the respective first members by a length; third stopper members attached to the inner ends of the second cover members such that when the first member reaches the first position, in the first telescopic cover assembly, the third stopper member abuts the first stopper member, and in the second telescopic cover assembly, the third stopper member abuts the second stopper member, and when the first member reaches the second position, in the first telescopic cover assembly, the third stopper member abuts the second cover member, and in the second telescopic cover assembly, the third stopper member abuts the first stopper member; fourth stopper members provided at the first and second ends of the second member such that when the first member reaches the first position, the fourth stopper member on the second end of the second member abuts the second cover member of the second telescopic cover assembly to stop its movement, and when the first member reaches the second position, the fourth stopper member on the first end of the second member abuts the second cover member of the first telescopic cover assembly to stop its movement.

BRIEF DESCRIPTION OF THE DRAWINGS

The above and other objects, features, and advantages of the present invention will be made more apparent from the ensuing description of a preferred embodiment in conjunction with the accompanying drawings wherein.

DESCRIPTION OF THE PREFERRED EMBODIMENTS

Figure 11:
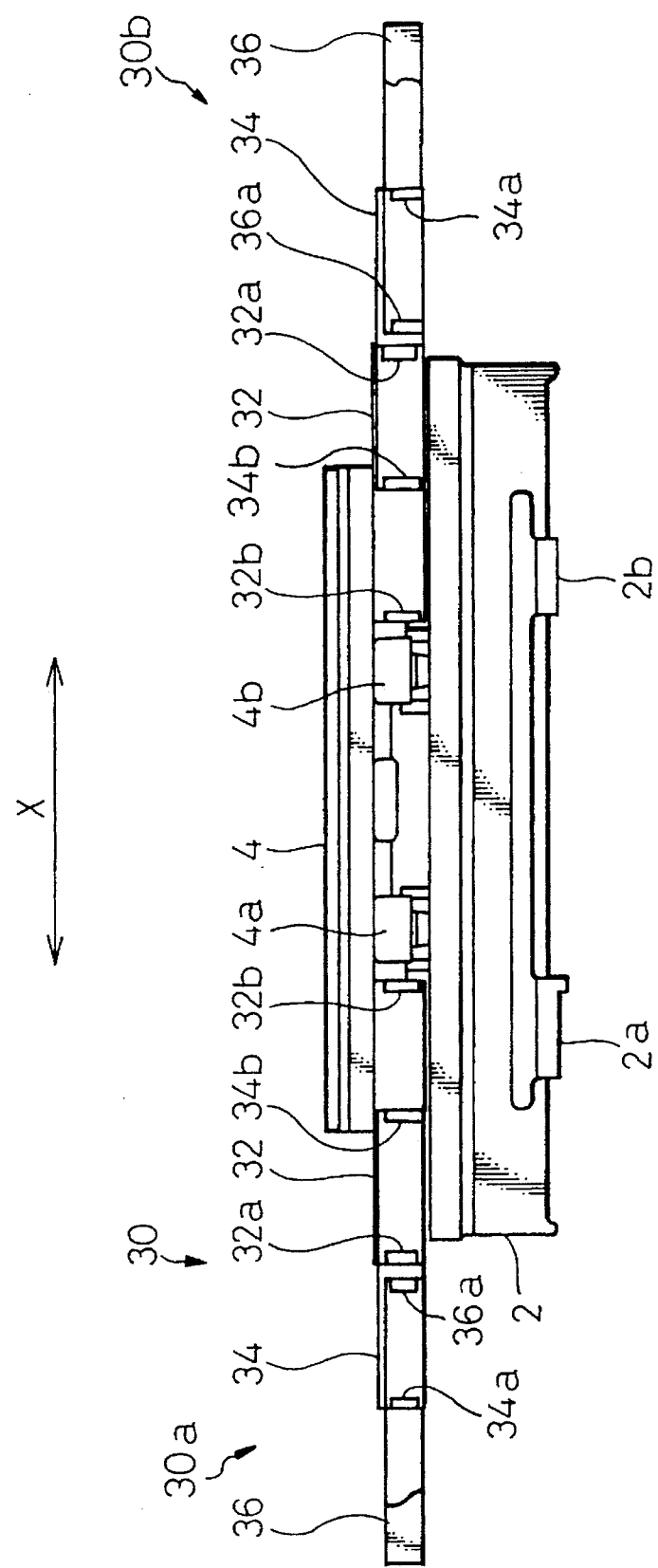
FIG. 11 is an illustration, similar to FIG. 1, according to the prior art.
Figure 12:
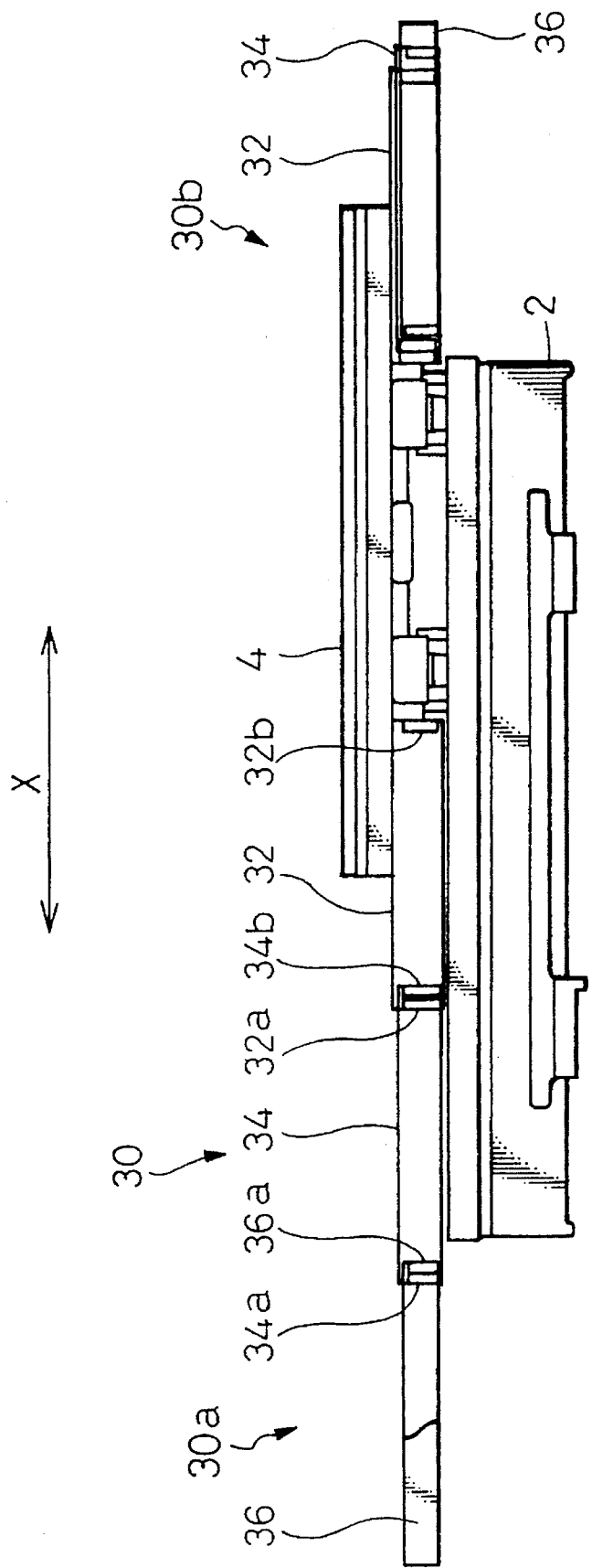
FIG. 12 is an illustration, similar to FIG. 11, in which the table reaches its maximum stroke.
Figure 13:
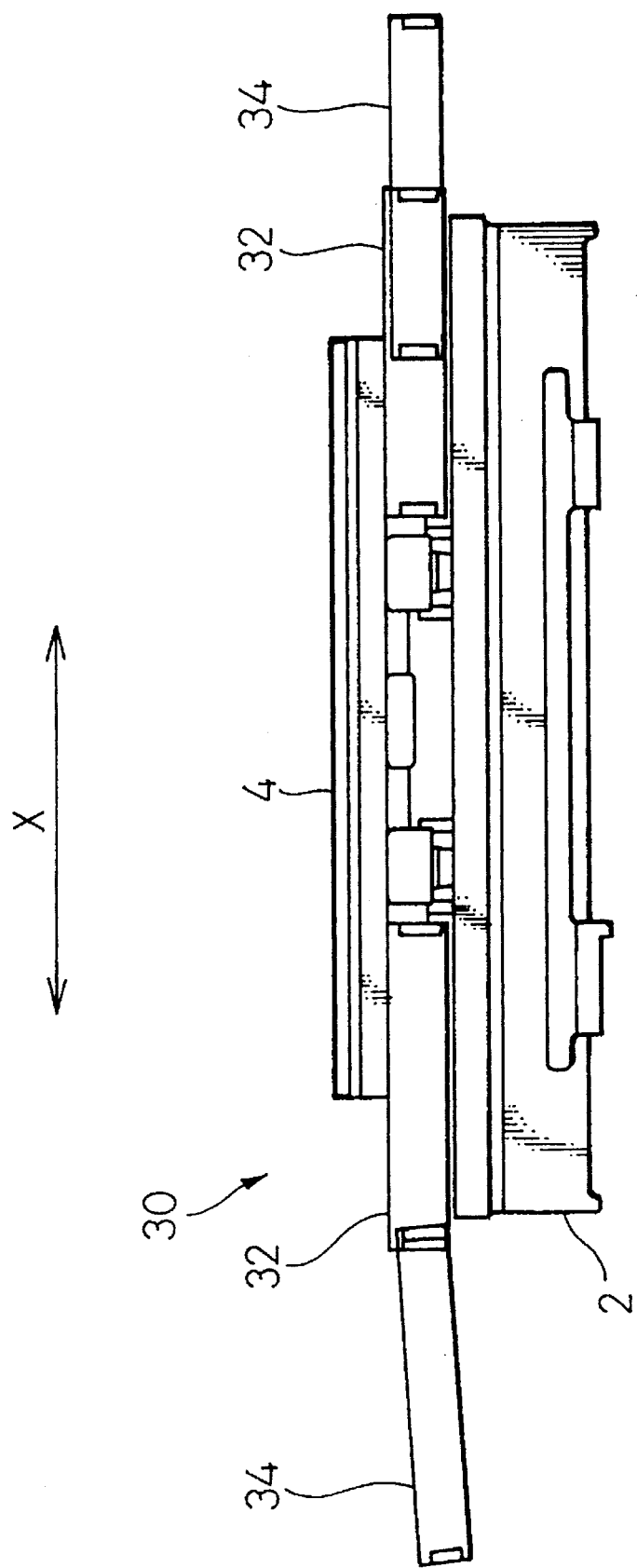
FIG. 13 is an illustration, similar to FIG. 1, according to the prior art in which outermost cover members are removed from the prior art telescopic cover.

With reference to FIGS. 11 to 13, a prior art telescopic cover for a machine tool (not shown) will be described.

In FIG. 11, a table 4 of a machine tool, on which a workpiece (not shown) is fixed, is mounted to a saddle 2 slidable in a direction indicated by an arrow X by means of a feeding mechanism with a sliding members 4a and 4b which slidably engage a linear guide members (not shown) and a ball screw (not shown) extending in the X-direction.

The saddle 2 is mounted to a column or a head (not shown) of the machine tool slidable in the Y-direction perpendicular to the X-direction by means of slide members 2a and 2b which slidably engage a linear guide members (not shown) and a ball screw extending in the Y-direction.

The feeding mechanism for moving the table 4 is provided in a space beneath the top face of the saddle 2.

A telescopic cover 30 is provided for protecting the feeding mechanism for the table 4. The telescopic cover 30 comprises first and second telescopic cover assemblies 30a and 30b provided on either side of the table 4 over the top face of the saddle 2. In order to protect the feeding mechanism, the telescopic cover 30 continuously closes over the top face of the saddle 2, beneath which the feeding mechanism for table 4 is provided, with the respective telescopic cover assemblies 30a and 30b telescopically moving when the table 4 moves in the X-direction.

The first and second telescopic cover assemblies 30a and 30b comprise first cover members 32 attached to the bottom face of the table 4, second cover members 34 and third cover members 36. The first, second and third cover members are made into a downwardly opening C shapes. The second cover members 34 are provided in the first cover members 32 slidably in the X-direction. Third cover members 36 are fixed to a stationary portion (not shown) of the machine tool, and provided such that the third cover member 36 can slide into and come out of the second cover members 34 when the table 4 moves in the X-direction.

When the table 4 moves in the X-direction, the first and second telescopic cover assemblies 30a and 30b telescopically retract and extend. When the table 4 moves, for example, to the right as shown in FIG. 12, in the second telescopic cover assemblies 30b, the second cover member 34 slides into the first cover member 32 and the third cover member 36 slides into the second cover member 24, and in the first cover assemblies 30a, the second cover member 34 comes out of the first cover member 32 and the third cover member 36 comes out of the second cover member 34.

The first cover members 32 have stopper members 32a and 32b attached to either end thereof. The second cover members 34 have stopper members 34a and 34b attached to either end thereof. The third cover members 36 have stopper members 36a attached to the inner ends thereof. The stopper members are made of an elastic material such as a rubber material or a plastic material.

When the table 4 reaches its maximum stroke in the X-direction, for example, to the right as shown in FIG. 12, in the first telescopic cover assembly 30a, the stopper members 32a of the first cover member 32 abut the stopper members 34b of the second cover member 34, and the stopper members 34a of the second cover member 34 abut the stopper members 36a of the third cover member 36. This prevents the second cover member 34 from falling from the first cover member 32 and the third cover member 36.

As well known by those skilled in the art, in general, no feeding mechanism is provided beneath the third cover members 36, which act as only a means for bearing and guiding the second cover members 34. Thus, the prior art telescopic cover 30 has room to be improved, in which the fixed outermost cover members, that is, the third cover members 36 are removed from the telescopic cover 30.

However, if the third cover members 36 are simply removed from the telescopic cover 30, the second cover members 34 will project from the first cover members 32 when the table 4 moves in the X-direction, as shown in FIG. 13. In this case, the first cover member 32 cannot support the second cover member 34 and the second cover member 34 inclines, which will impair the movement of the telescopic cover 30. The invention is directed to solve this problem.

With reference to FIGS. 1 to 8, the first embodiment of the invention will be described.

A telescopic cover 10 according to the first embodiment of the invention is provided for protecting the feeding mechanism for the table 4 as in the prior art. The telescopic cover 10 comprises first and second telescopic cover assemblies 10a and 10b. The first and second telescopic cover assemblies 10a and 10b comprise first cover members 12 attached to the table 4 and second cover members 14 provided in the first cover members 12 and slidable in the X-direction.

Figure 3:
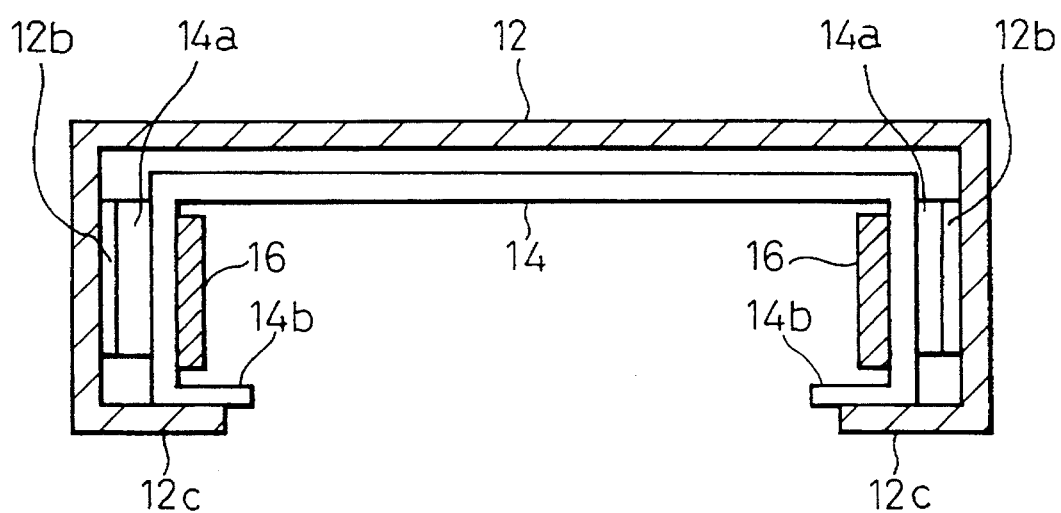
FIG. 3 is a side section of the telescopic cover along a vertical plane perpendicular to the longitudinal axis along which the telescopic cover extends and retracts.

The first cover members 12 are made into downwardly opening C shapes with bearing portions 12c for the second cover members 14 inwardly horizontally extending at the bottom ends of the first cover member 12 (see FIG. 3). The second cover members 14 are also made into downwardly opening C shapes with sliding portions 14a inwardly horizontally extending at the bottom ends thereof (see FIG. 3). The second cover members 14 are slidably supported in the X-direction on the top surface of the bearing portions 12c of the first cover members 12 by the sliding portions 14b. When the table 4 moves in the X-direction, the second cover members 14 move in connection with the first cover member 12 due to the friction forces between the sliding portions 14b and the bearing portions 12c of the first cover members 12.

Figure 1:
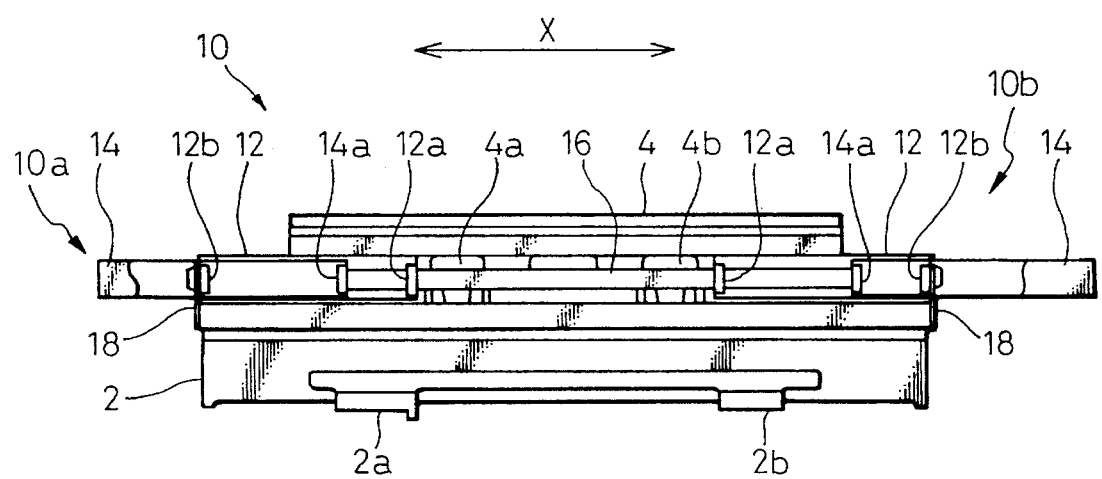
FIG. 1 is a schematic side elevation of a telescopic cover according to the first embodiment of the invention illustrated by a table on which a workpiece is fixed and a saddle of a machine tool, in which the side walls of the cover members are removed.
Figure 2:
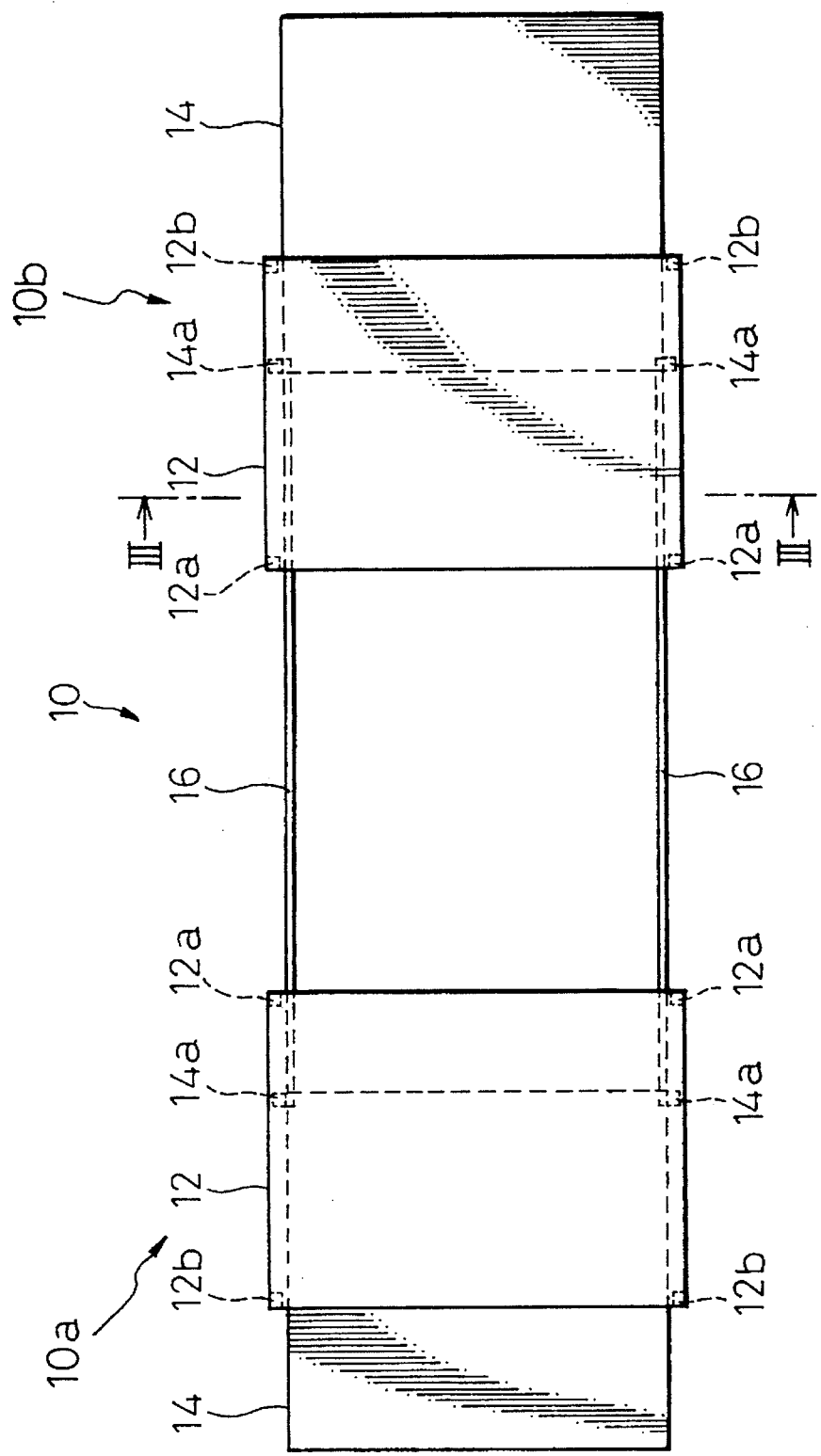
FIG. 2 is a plan view of the telescopic cover of FIG. 1.
Figure 7:
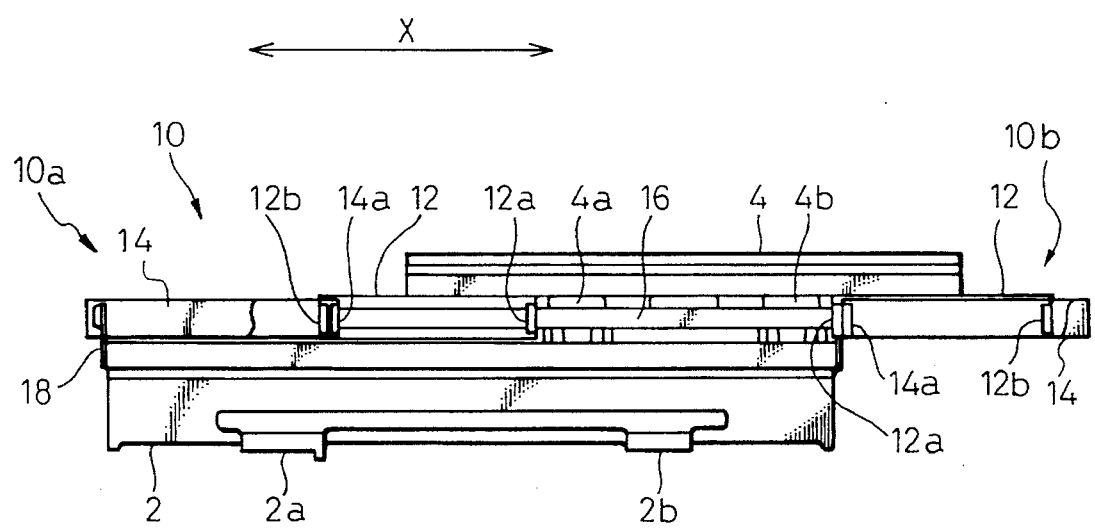
FIG. 7 is an illustration, similar to FIG. 1, in which the table reaches its maximum stroke.
Figure 8:
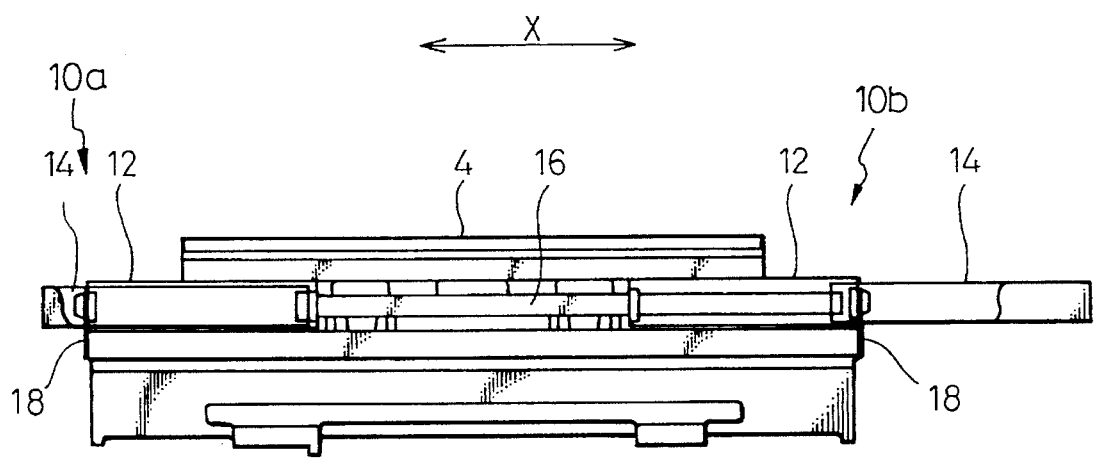
FIG. 8 is an illustration, similar to FIG. 7, in which the table has moved to an intermediate position, and a second cover member of a second telescopic cover assembly projects from a first cover member.

The first cover members 12 have stopper members 12a and 12b attached to either end thereof (see FIG. 2). The second cover members 14 have stopper members 14a attached to the inner ends of the respective second cover members 14. The stopper members are made of an elastic material such as a rubber material or a plastic material. When the table 4 moves to its maximum stroke in the X-direction, for example, to the right as shown in FIG. 7, in the first telescopic cover assembly 10a, the stopper members 12b of the first cover member 12 abut the stopper members 14a of the second cover member 14. The abutments between the stopper members of the first and second cover members 12 and 14 prevent the second cover member 14 from falling from the first cover member 12.

Figure 4:
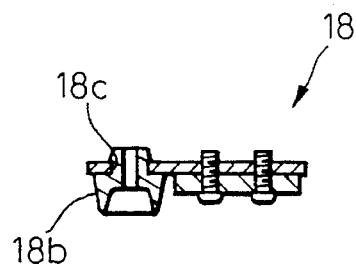
FIG. 4 is a section of a stroke limiting member, according to the embodiment of the invention, along a line IV—IV in FIG. 5.
Figure 5:
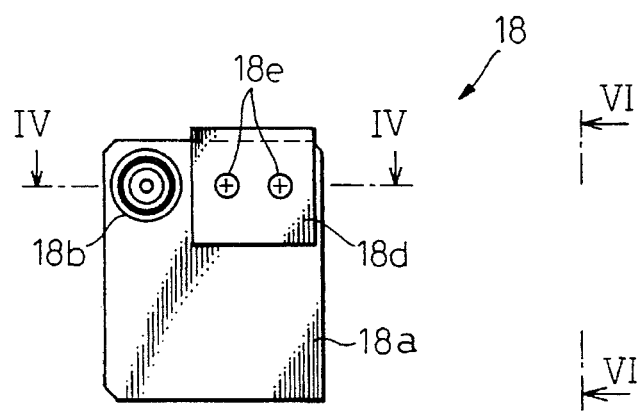
FIG. 5 is a front view of a stroke limiting member according to the embodiment of the invention.
Figure 6:
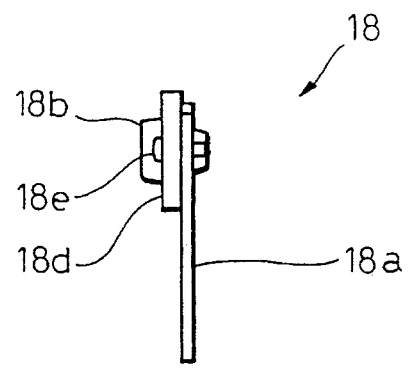
FIG. 6 is a section of a stroke limiting member according to the embodiment of the invention along a line VI—VI in FIG. 5.

Posts 18 for bearing and stopping the second cover members 14 are mounted to either end of the saddle 2. The posts 18 comprise, as shown in FIGS. 4 to 6, mounting plates 18a with holes 18c in the upper portions of the mounting plates 18a and abutting portions 18b of an elastic material, such as a rubber material or a soft plastic material. The abutting portions 18b are mounted to the respective mounting plates 18a by inserting them into the holes 18c.

The posts 18 further comprise bearing portions 18d for the second cover members 14. The bearing portions 18d are made of a bearing material such as brass or nylon and are suitable for bearing the second cover members 14 slidable in the X-direction. The bearing portions 18d are attached to the mounting plates 18a by screws 18e such that they project slightly from the top ends of the mounting plates 18a to contact the inner surfaces of the second cover members 14, and to bear the second cover member slidable in the X-direction.

When the table 4 reaches its maximum stroke in the X-direction, for example, when the table 4 reaches the right end of the stroke, as shown in FIG. 7, the abutting portion 18b of the post 18 provided at left side abuts the inner end surface of the second cover member 14 of the first telescopic cover assembly 10a to limit the sliding range of the second cover member 14 so that the second cover member 14 can continuously close over the top face of the saddle 2.

The second cover members 14 are connected to each other by a pair of connecting rods 16, which extend in the X-direction, to move together. The connected second cover members 14 are supported by the first cover members 12 as an element even if the one of the second cover members 14 projects from one of the first cover members 12, which prevents the second cover member from inclining. Thus, the movement of the telescopic cover 10 is not impaired.

The connected second cover members and the posts 18 allow the removal of the third cover members 36, in the prior art telescopic cover 30 which act as means for bearing and guiding the second cover members.

Figure 9:
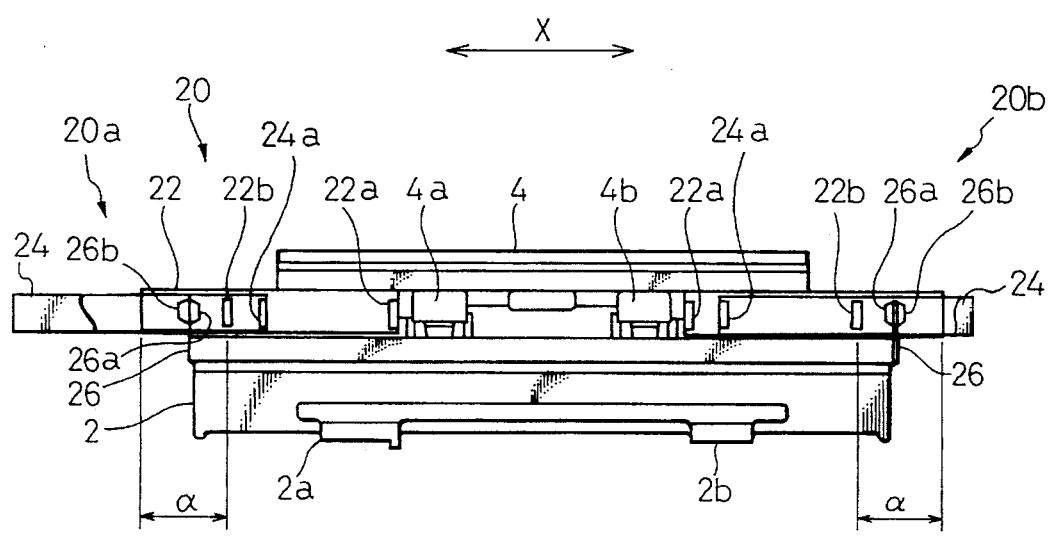
FIG. 9 is an illustration, similar to FIG. 1, according to the second embodiment of the invention.
Figure 10:
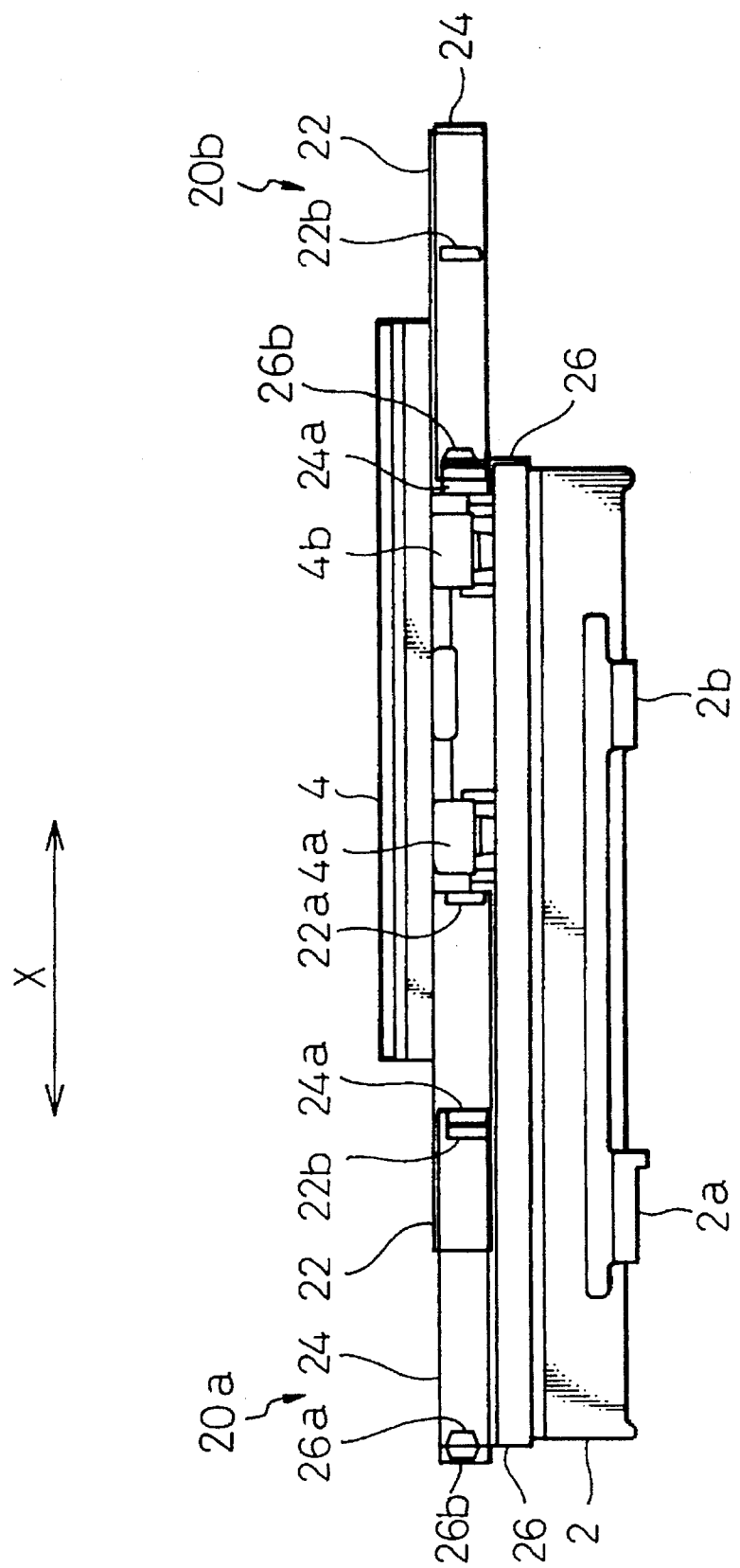
FIG. 10 is an illustration, similar to FIG. 9, in which the table reaches its maximum stroke.

With reference to FIGS. 9 and 10, the second embodiment of the invention will be described.

A telescopic cover 20 according to the second embodiment of the invention is also provided for protecting the feeding mechanism for the table 4 as in the prior art. The telescopic cover 20 comprises first and second telescopic cover assemblies 20a and 20b as in the first embodiment described above. The first and second telescopic cover assemblies 20a and 20b comprise first cover members 22 attached to the table 4 and second cover members 24 provided in the first cover members 22 and slidable in the X-direction.

The first cover members 22 are made into downwardly opening C shapes with bearing portions (not shown) for the second cover members 24 inwardly horizontally extending at the bottom ends of the first cover member 22. The second cover members 24 are also made into downwardly opening C shapes with sliding portions (not shown) inwardly horizontally extending at the bottom ends thereof. The second cover members 24 are slidably supported on the top surface of the bearing portions of the first cover members 22 by the sliding portions slidable in the X-direction. When the table 4 moves in the X-direction, the second cover members 24 move in connection with the first cover member 22 due to the friction forces between the sliding portions 24b and the bearing portions 22c of the first cover members 22.

The first cover members 22 have stopper members 22a and 22b. The stopper members 22a are attached to the inner ends of the first cover members 22. The stopper members 22b are attached to the inner side wall surfaces of the first cover members 22 at a longitudinal predetermined distance $\alpha$ from its outer end. The second cover members 24 have stopper members 24a attached to the inner end of the respective second cover members 24.

Posts 26 are provided at the either sides of the saddle 2. In FIGS. 9 and 10, the posts 26 are substantially the same as the posts 18 of the first embodiment, except that the posts 26 have two abutting portions 26a and 26b provided on either side of the mounting plate, while the posts 18 of the first embodiment have only the one abutting portion 18b (see FIGS. 4 to 6). However, the posts 26 may have one abutting portion 26b as in the first embodiment.

When the table 4 moves to its maximum stroke in the X-direction, for example, to the right as shown in FIG. 10, in the first telescopic cover assembly 20a, the stopper members 22b of the first cover member 22 abut the stopper members 24a of the second cover member 24, and the abutting portion 26b of the post 26 on the left side abuts the inner end surface of the second cover member 24 to limit the sliding range of the second cover member 24 so that the second cover member 24 can continuously close over the top face of the saddle 2.

At the same time, in the second telescopic cover assembly 20b, the stopper members 24a of the second cover member 24 abut the abutting portions 26a of the posts 26 on the right side. The abutments prevent the second cover member 24 from falling from the first cover member 22.

As shown in FIGS. 9 and 10, since the outer stopper members 22b of the first cover member 22 provided at a longitudinal distance $\alpha$ from the outer end of the first cover member 22, when the second cover member 24 projects from the first cover member 22 to its maximum projection, the second cover member 24 is supported by the portion of the first cover member 22 between the end and the longitudinal position $\alpha$ from the end of the first cover member 22.

The posts 26 and the portions between the end and the longitudinal position $\alpha$ from the end of the respective first cover members 22 hold the second cover members 24 horizontally and allow the removal of the third cover members 36, in the prior art telescopic cover (FIG. 13), which act as means for bearing and guiding the second cover members.

It should be understood that many modifications and variations will occur to persons skilled in the art without departing the scope and spirit of the invention as claimed in the accompanying claims.

We claim:

1. A telescopic cover, on a machine tool, which comprises a first member slidable between first and second positions along an axis and having first and second ends provided toward the first and second positions respectively, a second member provided beneath the first member stationary along the axis and having first and second ends provided toward the first and second positions respectively, and a feeding mechanism for moving the first member along the axis, the feeding mechanism being provided in a space beneath a horizontal plane substantially coincident with the top face of the second member, in which the telescopic cover comprises:

a pair telescopic cover assemblies attached to the first and second ends of the first member over the feeding mechanism such that the telescopic cover assemblies telescopically retract and extend along an axis when the first member moves along the axis;

the pair of telescopic cover assemblies comprising a pair of first cover members extending over the horizontal plane and attached to the first and second ends of the first member to move with the first member, a pair of second cover members extending over the horizontal plane and provided for the respective first cover members, the second cover members being slidable relative to the respective first cover members along the axis to retract into and come out of the respective first cover members, the first and second cover members having inner and outer ends along the axis respectively;

a means for limiting the moving range of the second member along the axis to maintain the second cover member over the feeding mechanism when the first member moves along the axis;

a means for bearing the second cover members slidable along the axis; and a means for connecting the second cover members to each other.

2. A telescopic cover according to claim 1, in which the first and second members are made into downwardly opening C shapes; and the connecting means comprises a pair of connecting rods extending parallel to the axis and connected to the respective inner ends of the second cover members.

3. A telescopic cover according to claim 2, in which the bearing means comprises;

bearing portions inwardly horizontally extending at the bottom ends of the first cover member;

sliding portions inwardly horizontally extending at the bottom ends of the second cover member, the second cover members being supported on the top surfaces of the bearing portion of the first cover members by the bottom surfaces of the sliding portion of the second cover members slidable along the axis;

bearing portions provided at the first and second ends of the second member to contact the inner surface of the second cover member.

4. A telescopic cover, according to claim 3, in which the limiting means comprises first stopper members attached to the inner ends of the first cover members;

second stopper members attached to the first cover members at the outer ends of the first cover members;

third stopper members attached to the inner ends of the second cover members such that when the first member reaches the first position, in the first telescopic cover assembly, the third stopper member abuts the first stopper member, and in the second telescopic cover assembly, the third stopper member abuts the second stopper member, and when the first member reaches the second position, in the first telescopic cover assembly, the third stopper member abuts the second cover member, and in the second telescopic cover assembly, the third stopper member abuts the first stopper member;

fourth stopper members provided at the first and second ends of the second member such that when the first member reaches the first position, the fourth stopper member on the second end of the second member abuts the second cover member of the second telescopic cover assembly to stop its movement, and when the first member reaches the second position, the fourth stopper member on the first end of the second member abuts the second cover member of the first telescopic cover assembly to stop its movement.

5. A telescopic cover, on a machine tool, which comprises a first member being slidable between first and second positions along an axis and having first and second ends provided toward the first and second positions respectively, a second member provided beneath the first member stationary along the axis and having first and second ends provided toward the first and second positions respectively, and a feeding mechanism for moving the first member along the axis, the feeding mechanism being provided in a space beneath a horizontal plane substantially coincident with the top face of the second member, in which the telescopic cover comprises:

a pair of telescopic cover assemblies attached to the first and second ends of the first member over the feeding mechanism such that the telescopic cover assemblies telescopically retract and extend along an axis when the first member moves along the axis;

the pair of telescopic cover assemblies comprising a pair of first cover members extending over the horizontal plane and attached to the first and second ends of the first member to move with the first member, a pair of second cover members extending over the horizontal plane and provided for the respective first cover members, the second cover members being slidable relative to the respective first cover members along the axis to retract into and come out of the respective first cover members, the first and second cover members having inner and outer ends along the axis respectively;

a means for limiting the moving range of the second member along the axis to maintain the second cover member over the feeding mechanism when the first member moves along the axis;

a means for bearing the second cover members slidable along the axis; and the limiting means comprises first stopper members attached to the inner ends of the first cover members; second stopper members attached to the first cover members distant from the outer ends of the respective first members by a length; third stopper members attached to the inner ends of the second cover members such that when the first member reaches the first position, in the first telescopic cover assembly, the third stopper member abuts the first stopper member, and in the second telescopic cover assembly, the third stopper member abuts the second stopper member, and when the first member reaches the second position, in the first telescopic cover assembly, the third stopper member abuts the second cover member, and in the second telescopic cover assembly, the third stopper member abuts the first stopper member; fourth stopper members provided at the first and second ends of the second member such that when the first member reaches the first position, the fourth stopper member on the second end of the second member abuts the second cover member of the second telescopic cover assembly to stop its movement, and when the first member reaches the second position, the fourth stopper member on the first end of the second member abuts the second cover member of the first telescopic cover assembly to stop its movement.

6. A telescopic cover according to claim 5, in which the first and second members are made into downwardly opening C shapes.

7. A telescopic cover according to claim 6, in which the bearing means comprises;

bearing portions inwardly horizontally extending at the bottom ends of the first cover member;

sliding portions inwardly horizontally extending at the bottom ends of the second cover member, the second cover members being supported on the top surfaces of the bearing portion of the first cover members by the bottom surfaces of the sliding portion of the second cover members slidable along the axis;

bearing portions provided at the first and second ends of the second member to contact the inner surface of the second cover member.

* * * * *